United States Patent
Ghose et al.

(10) Patent No.: US 7,133,158 B2
(45) Date of Patent: Nov. 7, 2006

(54) METHOD AND APPARATUS FOR EFFICIENT CACHING AND RENDERING OF LARGE PATTERNS IN A SMALL MEMORY PRINTER

(75) Inventors: Arunabha Ghose, Karnataka (IN); Ralph E. Payne, Dallas, TX (US); Venkat V. Easwar, Cupertino, CA (US)

(73) Assignee: Texas Instruments Incorporated, Dallas, TX (US)

( * ) Notice: Subject to any disclaimer, the term of this patent is extended or adjusted under 35 U.S.C. 154(b) by 847 days.

(21) Appl. No.: 10/259,551

(22) Filed: Sep. 27, 2002

(65) Prior Publication Data

US 2004/0061874 A1    Apr. 1, 2004

(51) Int. Cl.
*G06F 15/00* (2006.01)
*G06K 9/36* (2006.01)
*H04N 1/387* (2006.01)

(52) U.S. Cl. .................... 358/1.9; 358/1.16; 358/1.17; 358/453; 382/286; 382/287; 715/911

(58) Field of Classification Search .............. 358/1.16, 358/1.17, 1.18, 1.9, 403, 453; 715/911; 382/286, 382/287

See application file for complete search history.

(56) References Cited

U.S. PATENT DOCUMENTS

| | | | | |
|---|---|---|---|---|
| 6,115,131 A | * | 9/2000 | Payne | ................ 358/1.14 |
| 6,323,958 B1 | * | 11/2001 | Shimizu | ................ 358/1.9 |
| 6,734,987 B1 | * | 5/2004 | Cauligi | ................ 358/1.16 |
| 6,924,904 B1 | * | 8/2005 | Stevens et al. | ............ 358/1.18 |

* cited by examiner

*Primary Examiner*—Douglas Q. Tran
*Assistant Examiner*—Chan S. Park
(74) *Attorney, Agent, or Firm*—Robert D. Marshall, Jr.; W. James Brady; Frederick J. Telecky, Jr.

(57) ABSTRACT

A method of performing a pattern fill operation of a pattern into a clipping region resolves the pattern into an intermediate format between a page description language and a page bit map. This intermediate format is cached. For each tiling of the pattern into the clipping region the pattern is clipped to the clipping region and rendered from the clipped intermediate format pattern into a corresponding location of a page bit map. The intermediate format of the pattern may be scan line runs and trapezoid fills. The intermediate format of the pattern may be paths and curves. The clipping of the pattern to the clipping region performs scan line conversion with polygon to polygon clipping or trapezoid/run array to trapezoid/run array clipping.

10 Claims, 3 Drawing Sheets

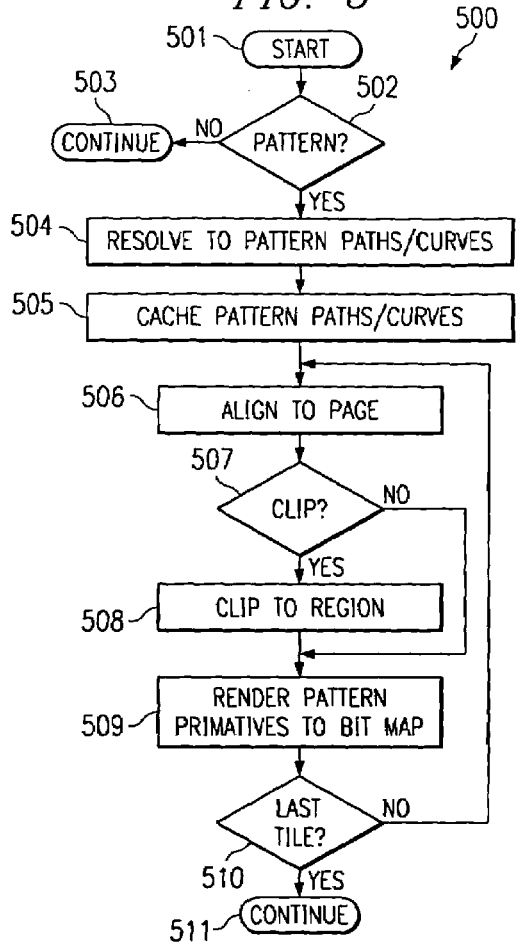
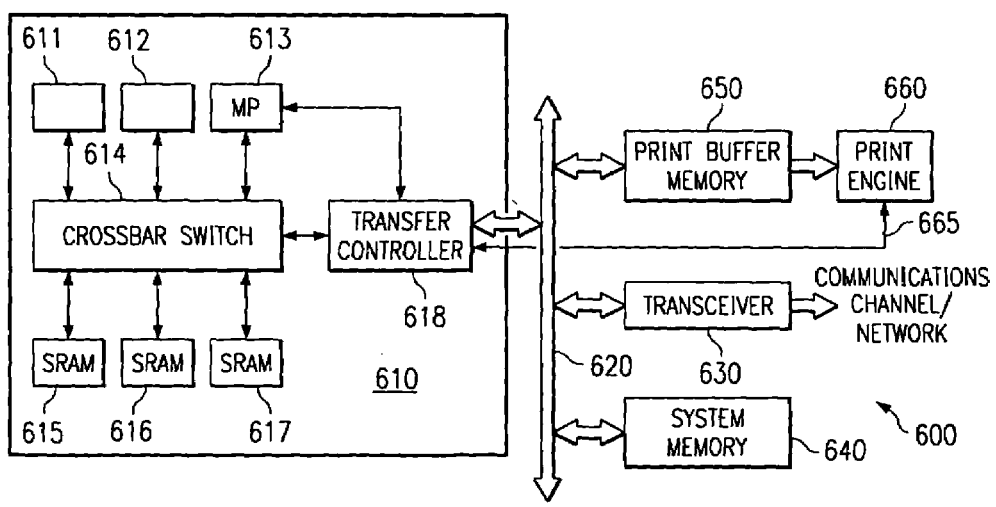

US 7,133,158 B2

METHOD AND APPARATUS FOR EFFICIENT CACHING AND RENDERING OF LARGE PATTERNS IN A SMALL MEMORY PRINTER

TECHNICAL FIELD OF THE INVENTION

The technical field of this invention is printer control and more particularly converting print data from a page description language to printer scan controls when rendering large patterns.

BACKGROUND OF THE INVENTION

A pattern fill operation employs a pattern in a repeating structure to fill a graphics object such as a polygon. In a page description languages like PostScript, patterns are typically reduced to images at the device resolution and stored in a pattern cache for later use to render objects in device space. However, storing the image for a large pattern in the pattern cache at high resolutions takes huge amounts of memory. This requirement of large amounts of memory is disadvantageous.

PostScript printers have traditionally either aborted a printed page upon exceeding the pattern cache capacity or have reverted to some method that was either slow, poor in quality or both. The interaction between the interpreter and the rendering made it difficult to band the display list and execute in a page pipeline mode where different pages are, simultaneously, in different stages of the conversion from page description language to page bit map. The PostScript Red Book, a reference for use of PostScript, explicitly limits the PostScript Language primitives that can be used to describe a large pattern. This limitation is an attempt to avoid the problems of caching large pattern primitives.

SUMMARY OF THE INVENTION

A method of performing a pattern fill operation of a pattern into a clipping region resolves the pattern into an intermediate format between a page description language and a page bit map. This intermediate format is cached. For each tiling of the pattern into the clipping region the pattern is clipped to the clipping region and rendered from the clipped intermediate format pattern into a corresponding location of a page bit map. The intermediate format of the pattern may be scan line runs and trapezoid fills. The intermediate format of the pattern may be paths and curves. The clipping of the pattern to the clipping region performs scan line conversion with polygon to polygon clipping or trapezoid/run array to trapezoid/run array clipping.

BRIEF DESCRIPTION OF THE DRAWINGS

These and other aspects of this invention are illustrated in the drawings, in which:

FIG. 5 illustrates in flow chart form an alternate manner of tiling a pattern into a region within a printer page; and FIG. 6 illustrates an example printer system such as would employ this invention.

DETAILED DESCRIPTION OF PREFERRED EMBODIMENTS

Many page description languages, such as PostScript, manage repeating patterns in the printed image. Typically the page description language defines the pattern, the region to be filled by the pattern and initial alignment. The page rendering process then fills a print page buffer with the pattern. The pattern is repeated and clipped to the region as required. It is typical to employ a pattern cache to store the pattern during this process. The whole pattern is rendered into the pattern cache as a bit map in the resolution of the printer. This pattern bit map is used as the source in the pattern fill operation. Copying the bit map from the pattern cache to a page bit map is faster than rendering from another source. Additionally, using a pattern cache means that the pattern need only be rendered once while it can be used multiple times. These factors tend to reduce the printer memory and computational requirements. This could create a problem for large patterns.

The speed of rendering patterns into the proper page locations affects the speed the printer prepares the page for printing. In some printers, such as ink jet printers, printing can pause between print lines for the data processing to catch up to the printing. In other printers, such as laser printers, the print process has a constant speed though the whole page. The page cannot be printed unless the data is ready at the precise time needed. Printing complex pages on printers of the second type often results in long pauses between pages for the next page to be composed.

Figure 1:
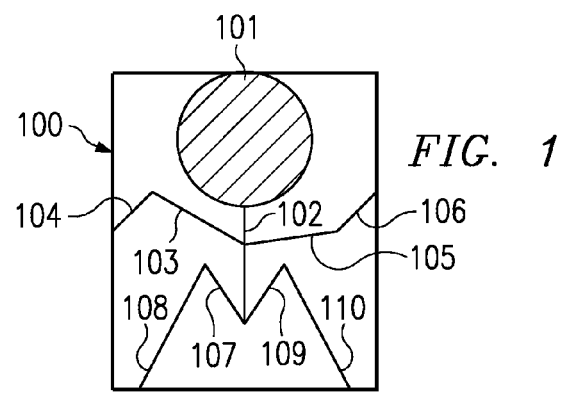
FIG. 1 illustrates an example pattern.
Figure 2:
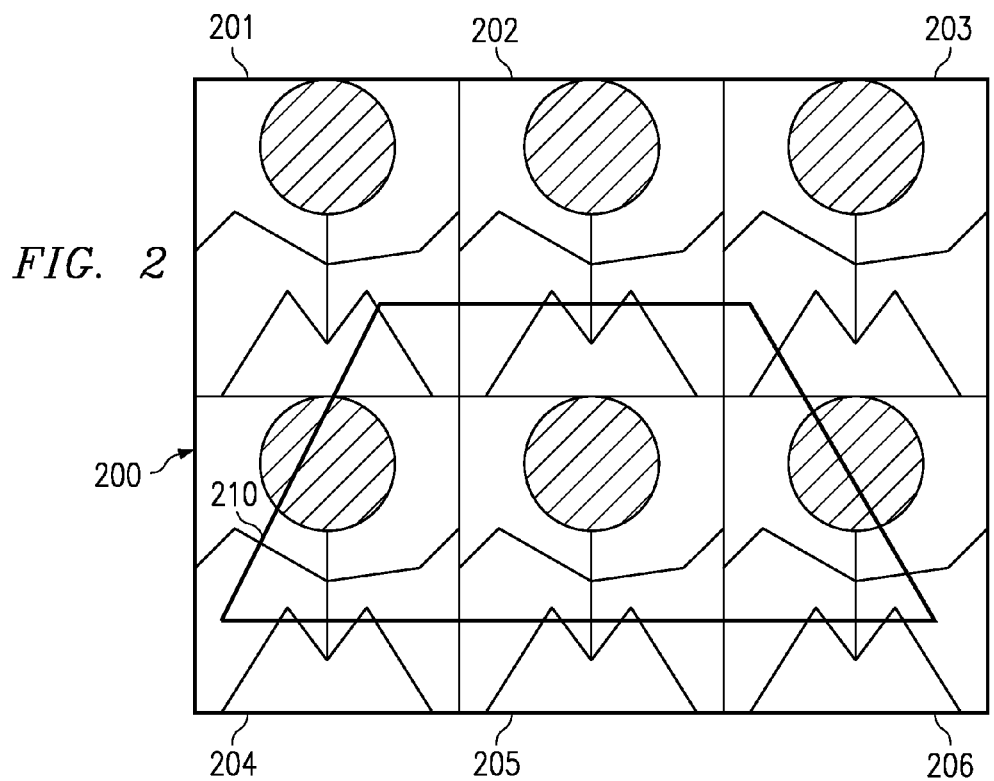
FIG. 2 illustrates an example of tiling the pattern of FIG. 1 into a clip region.
Figure 3:
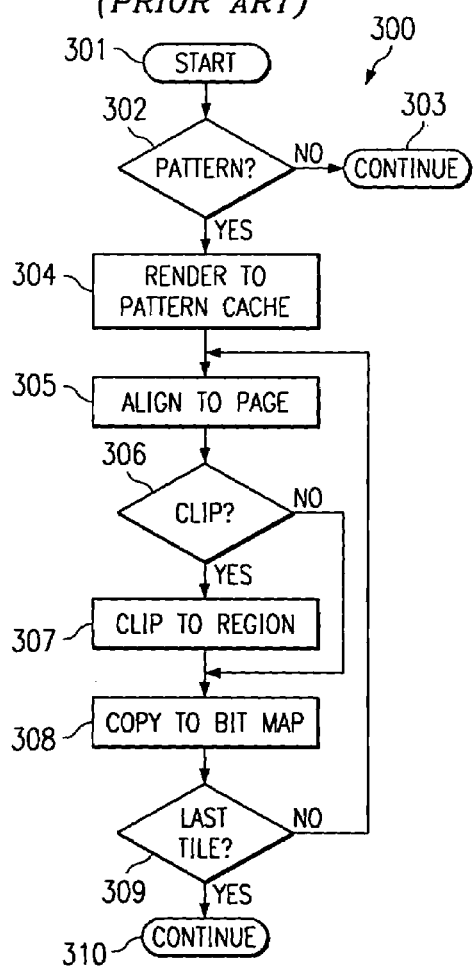
FIG. 3 illustrates in flow chart form the prior art manner of tiling a pattern into a region within a printed page.

This process is illustrated in FIGS. 1, 2 and 3. FIG. 1 illustrates pattern 100. Pattern 100 is specified in any manner permitted by the page description language. In the example of FIG. 1, pattern 100 is a display list consisting of filled circle 101 and lines 102, 103, 104, 105, 106, 107, 108, 109 and 110. As known in the art, each display list element includes parameters, such as location and color, to describe the element. Note that FIG. 1 merely illustrates an example pattern. Many such patterns are possible and there are other known many ways to specify the contents of the pattern.

FIG. 2 illustrates page 200 including a tiling of pattern 100 into trapezoid 210. FIG. 2 illustrates six tilings of pattern 100, namely 201, 202, 203, 204, 205 and 206. On rendering page 200 these tiling of pattern 100 will be clipped to trapezoid 210. Thus only those portions of tilings 201, 202, 203, 204, 205 and 206 enclosed within trapezoid 210 will be visible on page 200 when printed. This pattern fill operation must specify the alignment of the tilings 201, 202, 203, 204, 205 and 206 to trapezoid 210 in the coordinates of page 200. Though not illustrated in FIG. 2, those skilled in that art would realize that the relative sizes of pattern 100 and trapezoid 210 may permit one or more tilings of pattern 100 to fit wholly within trapezoid 210 without clipping.

FIG. 3 illustrates the rendering process of a pattern fill according to the prior art. Subroutine 300 is a part of the program that renders a page specified in a page description language into a page bit map that can be printed. Subroutine 300 begins with start block 301. Subroutine 300 first tests to determine if the page data requests a pattern fill (decision block 302). If not (No at decision block 302), then subroutine 300 is inapplicable. Page processing continues at block 303. If so (Yes at decision block 302), the subroutine 300 is applicable. Subroutine 300 renders the pattern into a pattern cache (processing block 304). This rendering involves converting the page description display list of pattern 100 into a page bit map of appropriate dimensions for the page bit map. This page bit map is stored in a portion of memory designated a pattern cache for ease of access.

Subroutine 300 next aligns that particular tiling of pattern 100 to the page (processing block 305). FIG. 2 illustrates tilings 201, 202, 203, 204, 205 and 206. Each of these tilings is set at a different location on page 200. Processing block 305 computes the proper alignment of that particular tiling to the coordinates of page 200.

Subroutine 300 next tests to determine if that tiling needs to be clipped (decision block 306). FIG. 2 illustrates tilings 201, 202, 203, 204, 205 and 206, all of which need to be clipped to fill trapezoid 210. As mentioned above, it is possible that a particular tiling of pattern 100 will completely fit within trapezoid 210. In that instance (No at decision block 306), the whole pattern is copied into the page bit map (processing block 308). In this instance the bit map data of pattern 100 stored within the pattern cache is copied to the corresponding locations within the page bit map. If the particular tiling of pattern 100 needs to be clipped to trapezoid 210 (Yes a decision block 306), then this tiling is clipped to trapezoid 210 (processing block 307). The unclipped portion of the tiling of pattern 100 is then copied to the page bit map (processing block 308). Those portions of the bit map of pattern 100 not clipped are copied into the corresponding locations of the page bit map.

Subroutine 300 then tests to determine if the present tiling of pattern 100 is the last (decision block 309). As illustrated in FIG. 2, pattern 100 fill to trapezoid 210 includes tilings 201, 202, 203, 204, 205 and 206. In the example of FIG. 2, for tilings 201, 202, 203, 204 and 205, there is another tiling (No at decision block 309). If this is the case, then subroutine 300 returns to processing block 305 and realigns pattern 100 to the new tiling. The process of blocks 305, 306, 307, 308 and 309 repeat for this new tiling. If this is the last tiling (Yes at decision block 309) such as tile 206 illustrated in FIG. 2, then subroutine 300 is complete. Processing continues for other portions of the page rendering at continue block 310.

This prior art technique has many advantages. The pattern is rendered to a bit map in the device coordinates only once. This avoids rendering the pattern for each tiling in the pattern file operation. Most of the fill operation is performed via simple and fast memory transfer operations from the pattern cache to the page bit map. The rendering of the pattern to the pattern cache typically employs the same techniques for rendering other page display list elements to the page bit map. Thus much computer code used in the rendering operation can be reused in the pattern fill operation.

There are problems with this prior art technique. Many problems arise when the pattern is large and thus requires a large amount of memory to store the pattern cache. Some printers are configured with a maximum allowable pattern cache. If the rendered pattern exceeds this size, this prior art technique cannot be used. The printer may not be able print such a page. In this case it would typically return an error message to the controlling computer. Large patterns will also cause problems in printers that have no fixed pattern cache allocation. A large pattern would crowd out other uses of memory. A large pattern may prevent the printer from being able to store the entire page bit map. The printer would be required to employ techniques to reduce memory usage in the rendering process. Some techniques, such as banding the page, require a minimum amount of processing capacity to be able to render a next band before a prior band has completed printing. Other techniques involve data compression of the rendered page bit map generally reducing the complexity and available detail of printed page.

Figure 4:
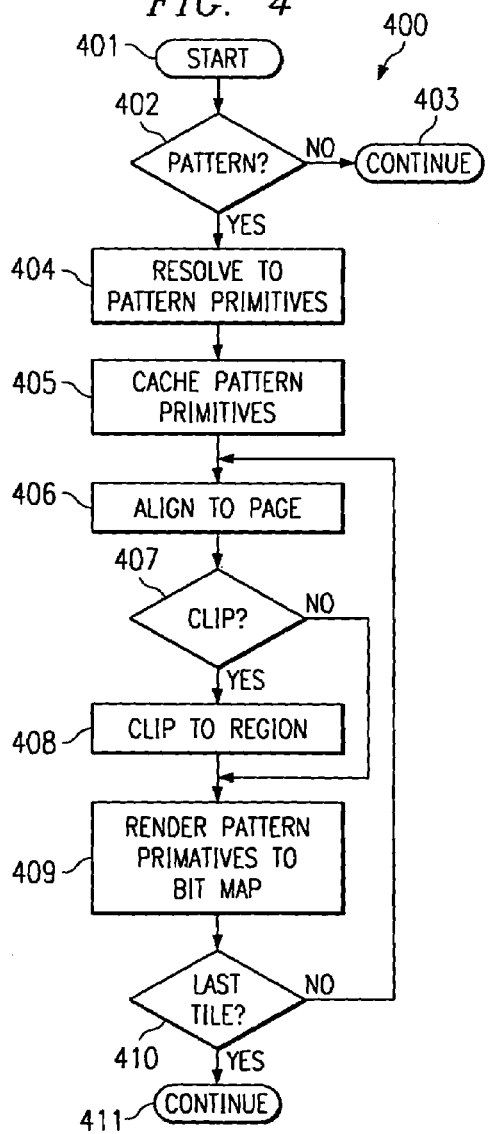
FIG. 4 illustrates in flow chart form a first embodiment manner of tiling a pattern into a region within a printed page according to this invention.

FIG. 4 illustrates the rendering process of a pattern fill according a first embodiment of this invention. Subroutine 400 is a part of the program that renders a page specified in a page description language into a page bit map that can be printed. Subroutine 400 begins with start block 401. Subroutine 400 first tests to determine if the page data requests a pattern fill (decision block 402). If not (No at decision block 402), then subroutine 400 is inapplicable. Page processing continues at block 403. If so (Yes at decision block 402), the subroutine 400 is applicable.

Subroutine 400 resolves the pattern into a pattern primitives (processing block 404). Rather than creating a bit map image from the pattern as in the prior art, this embodiment of the invention stores the pattern as a set of pattern primitives. The printer control system typically employ two types of primitives: object primitives from the graphics objects; and pattern primitives derived from a pattern. Pattern primitives include scan line runs and filled trapezoids. Processing block 404 resolves the pattern display list into a set of scan line runs and filled trapezoids. These pattern primitives are preferably aligned with the scan lines of the printer. These pattern primitives are then cached in the same manner as the pattern bit map of the prior art (processing block 405).

Generally large patterns may be stored as sets of primitives in less memory than as a bit map. Storing the pattern as a higher level description of the pattern than an image bit map typically reduces the amount of memory required to store the pattern.

Subroutine 400 next aligns that particular tiling of pattern 100 to the page (processing block 406). Processing block 406 computes the proper alignment of that particular tiling to the coordinates of page 200. It is easy to recalculate the start and end locations for scan line runs and filled trapezoids.

Subroutine 400 next tests to determine if that tiling needs to be clipped (decision block 407). If this tiling of the pattern does not require clipping (No at decision block 407), the pattern is rendered into the page bit map (processing block 409). The scan line runs and filled trapezoids of pattern 100 stored within the pattern cache are rendered to the corresponding locations within the page bit map. Because these pattern primitives are aligned with the print scan lines, this rendering is simple relative to rendering of the pattern display list to a bit map. If the particular tiling of pattern 100 needs to be clipped to trapezoid 210 (Yes a decision block 407), then this tiling is clipped to trapezoid 210 (processing block 408). This typically uses fairly simple trapezoid/run-array to trapezoid/ run-array clipping. Then the pattern is rendered in the device space. The unclipped portion of the tiling of pattern 100 is then rendered to the page bit map as noted above (processing block 409).

Subroutine 400 then tests to determine if the present tiling of pattern 100 is the last (decision block 410). If this is not the case (No at decision block 410), then subroutine 400 returns to processing block 406 and realigns pattern 100 to the new tiling. The process of blocks 406, 407, 408, 409 and 410 repeat for this new tiling. If this is the last tiling (Yes at decision block 410), then subroutine 400 is complete. Processing continues for other portions of the page rendering at continue block 411.

This technique has many of the advantages of the prior art illustrated in FIG. 3. Resolution of the pattern to pattern primitives consumes much of the work required to render the pattern into a bit map. Caching the resulting pattern primitives thus reuses much of that work. At the same time, the pattern primitives require much less storage space than a corresponding bit map. Thus the same printer can effectively handle larger patterns using this technique rather than the prior art.

FIG. 5 illustrates the rendering process of a pattern fill according a second embodiment of this invention. Subroutine 500 is a part of the program that renders a page specified in a page description language into a page bit map that can be printed. Subroutine 500 begins with start block 501. Subroutine 500 first tests to determine if the page data requests a pattern fill (decision block 502). If not (No at decision block 502), then subroutine 500 is inapplicable. Page processing continues at block 503. If so (Yes at decision block 502), the subroutine 500 is applicable.

Subroutine 500 resolves the pattern into a set of pattern paths and curves (processing block 504). Rather than creating a bit map image from the pattern as in the prior art, this embodiment of the invention stores the pattern as a set of paths and curves. Processing block 504 resolves the pattern display list into a set of paths and curves. These pattern paths and curves are then cached in the same manner as the pattern bit map of the prior art (processing block 505).

Generally large patterns may be stored as sets of paths and curves in less memory than as a bit map and in less memory than the prior primitives. Storing the pattern as a higher level description of the pattern than an image bit map typically reduces the amount of memory required to store the pattern.

Subroutine 500 next aligns that particular tiling of pattern 100 to the page (processing block 506). Processing block 506 computes the proper alignment of that particular tiling to the coordinates of page 200.

Subroutine 500 next tests to determine if that tiling needs to be clipped (decision block 507). If this tiling of the pattern does not require clipping (No at decision block 507), the pattern is rendered into the page bit map (processing block 509). The paths and curves of pattern 100 stored within the pattern cache are rendered to the corresponding locations within the page bit map. If the particular tiling of pattern 100 needs to be clipped to trapezoid 210 (Yes a decision block 507), then this tiling is clipped to trapezoid 210 (processing block 508) Then the pattern is rendered in the device space. The unclipped portion of the tiling of pattern 100 is then rendered to the page bit map as noted above (processing block 509).

Subroutine 500 then tests to determine if the present tiling of pattern 100 is the last (decision block 510). If this is not the case (No at decision block 510), then subroutine 500 returns to processing block 506 and realigns pattern 100 to the new tiling. The process of blocks 506, 507, 508, 509 and 510 repeat for this new tiling. If this is the last tiling (Yes at decision block 510), then subroutine 500 is complete. Processing continues for other portions of the page rendering at continue block 511.

This technique has some of the advantages of the prior art illustrated in FIG. 3 and has some advantages over the first embodiment of FIG. 4. Resolution of the pattern to pattern paths and curves consumes some of the work required to render the pattern into a bit map. Caching the resulting pattern paths and curves reuses this work. At the same time, the pattern paths and curves require much less storage space than a corresponding bit map of the prior art of FIG. 3 and less than the primitives of FIG. 4. This second embodiment does require greater computation that the prior art or the embodiment of FIG. 4. This second embodiment repeats more processing for each tiling of the pattern than the first embodiment of FIG. 4.

The clipping of processing block 508 may be performed using either of two techniques. This clipping can be accomplished by: performing scan-line conversion with polygon to polygon clipping; or synthesizing resultant trapezoids and later rendering the trapezoids. The former technique is better because the clipping path to path is more efficient than clipping trapezoids/run arrays to trapezoids/run arrays. Storing higher level paths is more efficient than storing trapezoids or run arrays. Rather than storing the paths and curves in their original form, these should be stored as a set of Y-sorted edges. Storing as Y-sorted edges will make later processing faster.

The prior art stores patterns for pattern fills as bitmap images in the pattern cache. For large patterns, this requires large amount of memory. This invention stores patterns in the pattern cache at a higher level of abstraction requiring less memory. This invention allows printers with less memory to print pages specified in a printer description language, such as PostScript, that include large patterns.

FIG. 6 is a block diagram of a network printer system 600 including a multiprocessor integrated circuit 610 constructed for image and graphics processing according to this invention. Multiprocessor integrated circuit 610 provides the data processing including data manipulation and computation for image operations of the network printer system 600. Multiprocessor integrated circuit 610 is bi-directionally coupled to a system bus 620.

Network printer system 600 includes transceiver 630. Transceiver 630 provides translation and bidirectional communication between system bus 620 and a communications channel. One example of a system employing transceiver 630 is a local area network. Network printer system 600 responds to print requests received via the communications channel of the local area network. Multiprocessor integrated circuit 610 provides translation of print jobs specified in a page description language, such as PostScript, into data and control signals for printing.

Network printer system 600 includes a system memory 640 coupled to system bus 620. System memory 640 may include video random access memory, dynamic random access memory, static random access memory, nonvolatile memory such as EPROM, FLASH or read only memory or a combination of these memory types. Multiprocessor integrated circuit 610 may be controlled either in wholly or partially by a program stored in system memory 640. System memory 640 may also store various types of graphic image data.

Multiprocessor integrated circuit 610 communicates with print buffer memory 605 for specification of a printable image via a pixel or bit map. Multiprocessor integrated circuit 610 controls the image data stored in print buffer memory 650 via system bus 620. Data corresponding to this image is recalled from print buffer memory 650 and supplied to print engine 660. Print engine 660 provides the mechanism that places color dots on the printed page. Print engine 660 is further responsive to control signals from multiprocessor integrated circuit 610 for paper and print head control. Multiprocessor integrated circuit 610 determines and controls where print information is stored in print buffer memory 650. Subsequently, during readout from print buffer memory 650, multiprocessor integrated circuit 610 determines the readout sequence from print buffer memory 650, the addresses to be accessed, and control information needed to produce the desired printed image by print engine 660.

Multiprocessor integrated circuit 610 may be embodied by a TMS320C82 digital signal processor (DSP). FIG. 6 illustrates the basic architecture of this digital signal processor.

Multiprocessor integrated circuit 610 is a single integrated circuit. This integrated circuit is a fully programmable parallel processing platform that integrates two digital signal processor cores 611 and 612, a reduced instruction set computer (RISC) master processor (MP) 613, multiple static random access memory (SRAM) blocks 615, 616 and 617, a crossbar switch 614 that interconnects all the internal processors and memories, and a transfer controller (TC) 618 that controls external communications. Transfer controller 618 is coupled to system bus 620. Note that transfer controller 618 controls all data transfer between multiprocessor integrated circuit 610 and other structured coupled to system bus 620. Image data may be stored in system memory 640.

In operation, the individual digital signal processors 611 and 612 operate independently to transform page description data received via transceiver 630 into a corresponding page bit map data. This transformation includes the pattern fill operation described above. This page bit map data is stored in print buffer memory 650 for supply to print engine 660. Each digital signal processor 611 and 612 signals transfer controller 618 to transfer data from system memory 640 to the corresponding SRAM 615 and 616. During the pattern fill operation described in this invention, digital signal processors 611 and 612 may use portions of the corresponding SRAM 615 and 616 for the pattern cache. Alternatively, digital signal processors 611 and 612 may each use a designated portion of system memory 640 for the pattern cache. Digital signal processors 611 and 612 perform a programmed image transformation function on data in place in the corresponding SRAMs 615 and 616. The program for control of this image transformation is preferably stored in a non-volatile portion of system memory 640. Access by digital signal processors 611 and 612 and master processor 613 to SRAMs 615, 616 and 617 is mediated by crossbar switch 614. When complete, digital signal processors 611 and 612 signal transfer controller 618 to transfer data to print buffer memory 650. Transfer controller 618 preferably also includes a control channel 665 to print engine 660. Control channel 665 enables control of print functions by multiprocessor integrated circuit 610. Master processor 613 is preferably programmed for high level functions such as communication control functions not relevant to this invention.

What is claimed is:

1. A method of performing a pattern fill operation of a pattern into a clipping region comprising the steps of:
   resolving the pattern into an intermediate format between a page description language and a page bit map;
   caching the pattern intermediate format;
   tiling the pattern to the bit map page including aligning each tiling of the pattern to the bit map page;
   for each tiling of the pattern to the bit map page overlapping the clipping region, clipping the cached intermediate format pattern to the clipping region and rendering the clipped intermediate format pattern into a corresponding location of the page bit map.

2. The method of performing the pattern fill operation of claim 1, wherein:
   said step of resolving the pattern into the intermediate format resolves the pattern into scan line runs and trapezoid fills.

3. The method of performing the pattern fill operation of claim 1, wherein:
   said step of resolving the pattern into the intermediate format resolves the pattern into paths and curves.

4. The method of performing the pattern fill operation of claim 3, wherein:
   said step of clipping the pattern to the clipping region performs scan line conversion with polygon to polygon clipping.

5. The method of performing the pattern fill operation of claim 3, wherein:
   said step of clipping the pattern to the clipping region performs trapezoid/run array to trapezoid/run array clipping.

6. A printer comprising:
   a transceiver adapted for bidirectional communication with a communications channel;
   a memory;
   a print engine adapted for placing color dots on a printed page according to received page bit map data and control signals; and
   a programmable data processor connected to said transceiver, said memory and said print engine, said programmable data processor programmed to:
      receive print data corresponding to pages to be printed from the communications channel via said transceiver;
      convert said print data into the page bit map data and control signals for supply to said print engine for printing a corresponding page, said conversion including executing a pattern fill operation by
         resolving the pattern into an intermediate format between a page description language and a page bit map;
         caching the pattern intermediate format;
         tiling the pattern to the bit map page including aligning each tiling of the pattern to the bit map page;
         for each tiling of the pattern to the bit map page overlapping the clipping region, clipping the cached intermediate format pattern to the clipping region and rendering the clipped intermediate format pattern into a corresponding location of the page bit map.

7. The printer of claim 6, wherein:
   said programmable data processor is programmed wherein said step of resolving the pattern into the intermediate format resolves the pattern into scan line runs and trapezoid fills.

8. The printer of claim 6, wherein:
   said programmable data processor is programmed wherein said step of resolving the pattern into the intermediate format resolves the pattern into paths and curves.

9. The printer of claim 8, wherein:
   said programmable data processor is programmed wherein said step of clipping the pattern to the clipping region performs scan line conversion with polygon to polygon clipping.

10. The printer operation of claim 8, wherein:
    said programmable data processor is programmed wherein said step of clipping the pattern to the clipping region performs trapezoid/run array to trapezoid/run array clipping.

* * * * *